United States Patent
Petrovic et al.

(10) Patent No.: US 9,706,235 B2
(45) Date of Patent: *Jul. 11, 2017

(54) TIME VARYING EVALUATION OF MULTIMEDIA CONTENT

(71) Applicant: Verance Corporation, San Diego, CA (US)

(72) Inventors: Rade Petrovic, San Diego, CA (US); Patrick George Downes, San Diego, CA (US)

(73) Assignee: Verance Corporation, San Diego, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/255,578

(22) Filed: Apr. 17, 2014

(65) Prior Publication Data

US 2014/0229963 A1  Aug. 14, 2014

Related U.S. Application Data

(63) Continuation of application No. 13/615,320, filed on Sep. 13, 2012, now Pat. No. 8,726,304.

(51) Int. Cl.
*H04N 7/16* (2011.01)
*H04H 60/33* (2008.01)
(Continued)

(52) U.S. Cl.
CPC ......... *H04N 21/252* (2013.01); *H04N 21/231* (2013.01); *H04N 21/25891* (2013.01);
(Continued)

(58) Field of Classification Search
CPC ........... H04N 21/252; H04N 21/44218; H04N 21/4756; H04N 21/488; H04N 21/8456;
(Continued)

(56) References Cited

U.S. PATENT DOCUMENTS 6,122,610 A   9/2000 Isabelle
6,145,081 A   11/2000 Winograd et al.
(Continued)

FOREIGN PATENT DOCUMENTS

JP  2004163855  6/2004
JP  2004173237  6/2004
(Continued)

OTHER PUBLICATIONS

Aris Technologies, Inc. "Audio Watermarking System to Screen Digital Audio Content for LCM Acceptance," May 1999 (17 pages).
(Continued)

*Primary Examiner* — Oschta Montoya
(74) *Attorney, Agent, or Firm* — Perkins Coie LLP; Donald L. Wenskay

(57) ABSTRACT

Methods, systems, devices and computer program products are provided to facilitate enhanced use and interaction with multimedia content that is based on a time-varying evaluation of the multimedia content. While a content is being presented on a first device, timing information identifying temporal locations of segments of the content within a content timeline are extracted. While the content is still being presented, a feedback received from the user is associated with the content using the timing information and transmitted to a database. The user then receives a response corresponding to feedback provided by a plurality of consumers of the multimedia content on a segment-by-segment basis.

37 Claims, 5 Drawing Sheets

(51) Int. Cl.
| | |
|---|---|
| *H04N 21/25* | (2011.01) |
| *H04N 21/442* | (2011.01) |
| *H04N 21/475* | (2011.01) |
| *H04N 21/488* | (2011.01) |
| *H04N 21/845* | (2011.01) |
| *H04N 21/231* | (2011.01) |
| *H04N 21/258* | (2011.01) |
| *H04N 21/414* | (2011.01) |
| *H04N 21/422* | (2011.01) |
| *H04N 21/4223* | (2011.01) |
| *H04N 21/44* | (2011.01) |
| *H04N 21/658* | (2011.01) |
| *H04N 21/8358* | (2011.01) |

(52) U.S. Cl.
CPC ... *H04N 21/41407* (2013.01); *H04N 21/4223* (2013.01); *H04N 21/42203* (2013.01); *H04N 21/44008* (2013.01); *H04N 21/44218* (2013.01); *H04N 21/44222* (2013.01); *H04N 21/4756* (2013.01); *H04N 21/488* (2013.01); *H04N 21/658* (2013.01); *H04N 21/8358* (2013.01); *H04N 21/8456* (2013.01)

(58) Field of Classification Search
CPC ........... H04N 21/231; H04N 21/25891; H04N 21/41407; H04N 21/42203; H04N 21/4223; H04N 21/44008; H04N 21/44222; H04N 21/658; H04N 21/8358
See application file for complete search history.

(56) References Cited

U.S. PATENT DOCUMENTS

| | | | |
|---|---|---|---|
| 6,175,627 B1 | 1/2001 | Petrovic et al. | |
| 6,427,012 B1 | 7/2002 | Petrovic | |
| 6,430,301 B1 | 8/2002 | Petrovic | |
| 6,628,918 B2 * | 9/2003 | Roschelle | G09B 7/00 434/322 |
| 6,683,958 B2 | 1/2004 | Petrovic | |
| 6,792,542 B1 | 9/2004 | Lee et al. | |
| 6,888,943 B1 | 5/2005 | Lam et al. | |
| 7,024,018 B2 | 4/2006 | Petrovic | |
| 7,159,118 B2 | 1/2007 | Petrovic | |
| 7,460,667 B2 | 12/2008 | Lee et al. | |
| 7,983,922 B2 | 7/2011 | Neusinger et al. | |
| 7,986,806 B2 | 7/2011 | Rhoads | |
| 7,991,995 B2 | 8/2011 | Rabin et al. | |
| 8,015,410 B2 | 9/2011 | Pelly et al. | |
| 8,055,013 B2 | 11/2011 | Levy et al. | |
| 8,059,815 B2 | 11/2011 | Lofgren et al. | |
| 8,059,858 B2 | 11/2011 | Brundage et al. | |
| 8,085,935 B2 | 12/2011 | Petrovic | |
| 8,138,930 B1 | 3/2012 | Heath | |
| 8,151,113 B2 | 4/2012 | Rhoads | |
| 8,181,262 B2 | 5/2012 | Cooper et al. | |
| 8,189,861 B1 | 5/2012 | Rucklidge | |
| 8,194,803 B2 | 6/2012 | Baum et al. | |
| 8,249,992 B2 | 8/2012 | Harkness et al. | |
| 8,280,103 B2 | 10/2012 | Petrovic et al. | |
| 8,301,893 B2 | 10/2012 | Brundage | |
| 8,315,835 B2 | 11/2012 | Tian et al. | |
| 8,321,679 B2 | 11/2012 | Petrovic et al. | |
| 8,340,348 B2 | 12/2012 | Petrovic et al. | |
| 8,346,532 B2 | 1/2013 | Chakra et al. | |
| 8,346,567 B2 | 1/2013 | Petrovic et al. | |
| 8,467,717 B2 | 6/2013 | Croy et al. | |
| 8,479,225 B2 | 7/2013 | Covell et al. | |
| 8,533,481 B2 | 9/2013 | Petrovic et al. | |
| 8,538,066 B2 | 9/2013 | Petrovic et al. | |
| 8,588,459 B2 | 11/2013 | Bloom et al. | |
| 8,589,969 B2 | 11/2013 | Falcon | |
| 8,601,504 B2 | 12/2013 | Stone et al. | |
| 8,615,104 B2 | 12/2013 | Petrovic et al. | |
| 8,645,353 B2 * | 2/2014 | Kong | G06F 17/30864 707/709 |
| 8,682,026 B2 | 3/2014 | Petrovic et al. | |
| 8,726,304 B2 | 5/2014 | Petrovic et al. | |
| 8,745,403 B2 | 6/2014 | Petrovic | |
| 8,781,967 B2 | 7/2014 | Tehranchi et al. | |
| 8,791,789 B2 | 7/2014 | Petrovic et al. | |
| 8,806,517 B2 | 8/2014 | Petrovic et al. | |
| 8,811,655 B2 | 8/2014 | Petrovic et al. | |
| 8,838,977 B2 | 9/2014 | Winograd et al. | |
| 8,838,978 B2 | 9/2014 | Winograd et al. | |
| 8,869,222 B2 | 10/2014 | Winograd et al. | |
| 8,923,548 B2 | 12/2014 | Petrovic et al. | |
| 9,009,482 B2 | 4/2015 | Winograd | |
| 9,055,239 B2 | 6/2015 | Tehranchi et al. | |
| 9,106,964 B2 | 8/2015 | Zhao | |
| 9,117,270 B2 | 8/2015 | Wong et al. | |
| 2002/0120925 A1 * | 8/2002 | Logan | A23L 1/3002 725/9 |
| 2002/0199194 A1 | 12/2002 | Ali | |
| 2004/0133906 A1 * | 7/2004 | Przybylek | H04H 60/40 725/9 |
| 2005/0144632 A1 | 6/2005 | Mears et al. | |
| 2007/0039018 A1 | 2/2007 | Saslow et al. | |
| 2007/0271580 A1 * | 11/2007 | Tischer | H04H 60/07 725/35 |
| 2011/0126236 A1 * | 5/2011 | Arrasvuori | H04N 21/4532 725/46 |
| 2011/0246901 A1 * | 10/2011 | Gichuhi | G06Q 10/10 715/738 |
| 2011/0261667 A1 | 10/2011 | Ren et al. | |
| 2011/0293090 A1 | 12/2011 | Ayaki et al. | |
| 2011/0320627 A1 | 12/2011 | Landow et al. | |
| 2012/0023595 A1 | 1/2012 | Speare et al. | |
| 2012/0072731 A1 | 3/2012 | Winograd et al. | |
| 2012/0102304 A1 | 4/2012 | Brave | |
| 2012/0122429 A1 | 5/2012 | Wood et al. | |
| 2012/0129547 A1 | 5/2012 | Andrews, III et al. | |
| 2012/0203556 A1 | 8/2012 | Villette et al. | |
| 2012/0203734 A1 | 8/2012 | Spivack et al. | |
| 2012/0216236 A1 | 8/2012 | Robinson et al. | |
| 2012/0265735 A1 | 10/2012 | McMillan et al. | |
| 2012/0272012 A1 | 10/2012 | Aronovich et al. | |
| 2012/0272327 A1 | 10/2012 | Shin et al. | |
| 2012/0300975 A1 | 11/2012 | Chalamala et al. | |
| 2012/0304206 A1 | 11/2012 | Roberts et al. | |
| 2012/0308071 A1 | 12/2012 | Ramsdell et al. | |
| 2013/0014146 A1 * | 1/2013 | Bhatia | H04N 21/252 725/14 |
| 2013/0031579 A1 | 1/2013 | Klappert | |
| 2013/0060837 A1 | 3/2013 | Chakraborty et al. | |
| 2013/0073065 A1 | 3/2013 | Chen et al. | |
| 2013/0129303 A1 | 5/2013 | Lee et al. | |
| 2013/0151855 A1 | 6/2013 | Petrovic et al. | |
| 2013/0151856 A1 | 6/2013 | Petrovic et al. | |
| 2013/0152210 A1 | 6/2013 | Petrovic et al. | |
| 2014/0067950 A1 | 3/2014 | Winograd | |
| 2014/0074855 A1 | 3/2014 | Zhao et al. | |
| 2014/0075465 A1 | 3/2014 | Petrovic et al. | |
| 2014/0075469 A1 | 3/2014 | Zhao | |
| 2014/0267907 A1 | 9/2014 | Downes et al. | |
| 2014/0270337 A1 | 9/2014 | Zhao et al. | |
| 2014/0279549 A1 | 9/2014 | Petrovic et al. | |
| 2014/0325550 A1 | 10/2014 | Winograd et al. | |
| 2014/0325673 A1 | 10/2014 | Petrovic | |
| 2015/0030200 A1 | 1/2015 | Petrovic et al. | |
| 2015/0121534 A1 | 4/2015 | Zhao et al. | |

FOREIGN PATENT DOCUMENTS

| | | |
|---|---|---|
| JP | 2004193843 | 7/2004 |
| JP | 2004194233 | 7/2004 |
| JP | 2004328747 | 11/2004 |
| JP | 2005051733 | 2/2005 |
| JP | 2005-094107 | 4/2005 |
| JP | 2005525600 | 8/2005 |
| JP | 20100272920 | 12/2010 |
| KR | 1020080087047 | 9/2008 |

(56) References Cited

FOREIGN PATENT DOCUMENTS

| KR | 20100009384 | 1/2010 |
|---|---|---|
| KR | 1020120128149 | 11/2012 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |
| WO | 2010135687 | 11/2010 |
| WO | 2011116309 | 9/2011 |
| WO | 2013163921 | 11/2013 |

OTHER PUBLICATIONS

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Kirovski, D., et al., "Multimedia content screening using a dual watermarking and fingerprinting system," Proceedings of the tenth ACM international conference, pp. 372-381, 2002.

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

Bangaleea, R., et al., "Performance improvement of spread spectrum spatial-domain watermarking scheme through diversity and attack characterisation," IEEE Africon, pp. 293-298, 2002.

Kalker, T., et al., "System issues in digital image and video watermarking for copy protection," Proc. IEEE Int. Conf. on Multimedia Computing and Systems, pp. 562-567, Jun. 1999.

Kirovski, D., et al., "Multimedia content screening using a dual watermarking and fingerprinting system," Multimedia '02 Proceedings of the tenth ACM international conference on Multimedia, 2002 (11 pages).

Verance Corporation, "Confirmedia," PowerPoint presentation made to National Association of Broadcasters, Apr. 24, 2001 (40 pages).

\* cited by examiner

TIME VARYING EVALUATION OF MULTIMEDIA CONTENT

CROSS REFERENCE TO RELATED APPLICATIONS

This patent application is a continuation of and claims priority to U.S. patent application Ser. No. 13/615,320, filed Sep. 13, 2012, now U.S. Pat. No. 8,726,304. The entire content of the before-mentioned patent application is incorporated by reference as part of the disclosure of this application.

FIELD OF INVENTION

The present application generally relates to the field of multimedia content presentation, analysis and feedback.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content.

A multimedia content, such as an audiovisual content, often consists of a series of related images which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc. In some scenarios, such a multimedia content, or portions thereof, may contain only one type of content, including, but not limited to, a still image, a video sequence and an audio clip, while in other scenarios, the multimedia content, or portions thereof, may contain two or more types of content.

SUMMARY

The disclosed embodiments relate to methods, devices and computer program products that facilitate enhanced use and interaction with a multimedia content. One aspect of the disclosed embodiments relates to a method that comprises obtaining, at a second device, one or more timing information associated with at least a portion of a multimedia content while the multimedia content is being presented by a first device, where the timing information identifies temporal location(s) of one or more segments of the multimedia content within a timeline of the multimedia content. The method also includes receiving feedback regarding the multimedia content from a user interface of the second device while the multimedia content is being presented by a first device, where the received feedback is not initiated based upon the timing information. Such a method additionally comprises associating the received feedback with at least one of the obtained timing information, transmitting the received feedback and the associated timing information to a database, and receiving a response corresponding to feedback provided by a plurality of consumers of the multimedia content on a segment-by-segment basis.

In one exemplary embodiment, the timing information is obtained from time codes associated with a wireless transmission of the multimedia content. In another exemplary embodiment, the timing information is obtained from time codes associated with the multimedia content as stored on an optical data storage medium. In another exemplary embodiment, the timing information is obtained from watermarks embedded in the portion(s) of the multimedia content. In still another embodiment, the timing information is obtained by computing one or more fingerprints for the portions portion(s) of the multimedia content, and comparing the computed fingerprints with a sequence of fingerprints stored at a fingerprint database.

According to another exemplary embodiment, synchronization with the multimedia content is established using the timing information obtained from a plurality of synchronization channels. For example, synchronization is established by selecting one of the plurality of synchronization channels based on a reliability ranking of the plurality of the synchronization channels. In one exemplary embodiment, the above note method further comprises obtaining identification information associated with the multimedia content. For instance, the identification information can be obtained using watermarks embedded in the portion(s) of the multimedia content. In another example embodiment, the identification information is obtained by computing one or more fingerprints for the portions portion(s) of the multimedia content, and comparing the computed fingerprints with a sequence of fingerprints stored at a fingerprint database.

In one exemplary embodiment, receiving the feedback comprises detecting a motion of at least one of: a user of the second device and the second user device. In another exemplary embodiment, receiving the feedback comprises obtaining a video and/or an audio signal of a user of the second device, and processing the video and/or the audio signal to discern the user's preferences of the multimedia content.

According another embodiment, the above noted method further includes transmitting an indication of lack of received feedback for one or more segments of the multimedia content to the database. In one exemplary embodiment, the above noted method further comprising transmitting one or more of the following to the database: an identification information associated with the second device, an identification information associated with a user of the second device, a duration of multimedia content viewing prior to receiving the feedback, information indicative of successful or unsuccessful acquisition of timing information for the one or more multiple segments of the multimedia content, and comments provided by a user of the second device.

In another exemplary embodiment, the response includes one or more of the following: aggregated results or statistical summaries of the feedback provided by the plurality of consumers for each segment of the multimedia content, information corresponding to yet-to-be-presented segments of the multimedia content, and information corresponding to feedback provided by a subset of the plurality of consumers. In yet another exemplary embodiment, the above noted method further includes receiving additional information associated with the multimedia content based on the obtained timing information, where the additional information comprises one or more of: information associated with a character appearing in a particular segment of the multimedia content that is being presented, and information associated with a scene in a particular segment of the multimedia content that is being presented.

According to one exemplary embodiment, the above noted method further comprises receiving one or more of: a reward based on the obtained timing information, and an opportunity for purchasing an item based on the obtained timing information. In another exemplary embodiment, the above noted method further comprises: receiving the transmitted feedback and the associated timing information at the database, processing the feedback and the associated timing information at the database to produce at least a portion of the response, and transmitting the response from the database to the second device.

Another aspect of the disclosed embodiments relates to a device that includes a processor and a memory that includes processor executable code. The processor executable code, when executed by the processor, configures the device to obtain one or more timing information associated with at least a portion of a multimedia content while the multimedia content is being presented by a different device, where the timing information identifies temporal location(s) of one or more segments of the multimedia content within a timeline of the multimedia content. The processor executable code, when executed by the processor, also configures the device to receive feedback regarding the multimedia content from a user interface of the device while the multimedia content is being presented by the different device, where the received feedback is not initiated based upon the timing information. The processor executable code, when executed by the processor, additionally configures the device to associate the received feedback with at least one of the obtained timing information, transmit the received feedback and the associated timing information to a database, and receive a response, the response corresponding to feedback provided by a plurality of consumers of the multimedia content on a segment-by-segment basis.

Another aspect of the disclosed embodiments relates to a computer program product, embodied on a non-transitory computer readable medium, that includes program code for obtaining one or more timing information associated with at least a portion of a multimedia content while the multimedia content is being presented by a first device, where the timing information identifies temporal location(s) of one or more segments of the multimedia content within a timeline of multimedia content. The computer program product further includes program code for receiving feedback regarding the multimedia content from a user interface of the second device while the multimedia content is being presented by the first device, where the received feedback is not initiated based upon the timing information. The computer program product additionally includes program code for associating the received feedback with at least one of the obtained timing information, program code for transmitting the received feedback and the associated timing information to a database, and program code for receiving a response, where the response corresponds to feedback provided by a plurality of consumers of the multimedia content on a segment-by-segment basis.

Another aspect of the disclosed embodiments relates to a system that includes a timing information detector configured to obtain one or more timing information associated with at least a portion of a multimedia content while the multimedia content is being presented by a first device, where the timing information identifies temporal location(s) of one or more segments of the multimedia content within a timeline of the multimedia content. The above noted system additionally includes a user interface configured to receive user feedback regarding the multimedia content, where the user feedback is not initiated based upon the timing information, and a synchronization component configured to associate the received feedback with at least one of the obtained timing information. The above noted system also includes a communication unit configured to transmit the received user feedback and the associated timing information to a database and to receive a response corresponding to feedback provided by a plurality of consumers of the multimedia content on a segment-by-segment basis. The above noted system can be implemented within a single device, or as part of multiple devices, such as in a distributed system.

In one exemplary embodiment, the timing information detector is configured to obtain one or more timing information from time codes associated with a wireless transmission of the multimedia content. In another exemplary embodiment, the timing information detector is configured to obtain one or more timing information from time codes associated with the multimedia content as stored on an optical data storage medium. In still another exemplary embodiment, the timing information detector is configured to obtain one or more timing information from watermarks embedded in the portion(s) of the multimedia content. In yet another exemplary embodiment, the timing information detector is configured to obtain one or more timing information by computing one or more fingerprints for the portions portion(s) of the multimedia content, and comparing the computed fingerprints with a sequence of fingerprints stored at a fingerprint database.

In another exemplary embodiment, the synchronization component is configured to establish synchronization with the multimedia content by using the timing information obtained from a plurality of synchronization channels. For example, the synchronization component can be configured to establish synchronization by selecting one of the plurality of synchronization channels based on a reliability ranking of the plurality of the synchronization channels. In one embodiment, the above noted system further includes an identification code extractor that is configured to obtain identification information associated with the multimedia content. For example, the identification code extractor can be configured to obtain the identification information using watermarks embedded in the portion(s) of the multimedia content. In another example, the identification code extractor is configured to obtain the identification information is obtained by computing one or more fingerprints for the portions portion(s) of the multimedia content, and comparing the computed fingerprints with a sequence of fingerprints stored at a fingerprint database.

According to another exemplary embodiment, the user feedback comprises detecting a motion of at least one of: a user of the system and a component of the system. In yet another exemplary embodiment, at least a portion of the user feedback is received as a video and/or an audio signal of a user of the system, and the system further comprises a processor configured to process the video and/or the audio signal to discern the user's preferences of the multimedia content. In one exemplary embodiment, the communication unit is further configured to transmit an indication of lack of received user feedback for one or more segments of the multimedia content to the database. In another exemplary embodiment, the communication unit is further configured to transmit one or more of the following to the database: an identification information associated with the second device, an identification information associated with a user of the second device, a duration of multimedia content viewing prior to receiving the feedback, information indicative of successful or unsuccessful acquisition of timing information for the one or more multiple segments of the multimedia content, and comments provided by a user of the second device.

In another exemplary embodiment, the communication unit is further configured to receive additional information associated with the multimedia content based on the obtained timing information, where the additional information comprises one or more of information associated with a character appearing in a particular segment of the multimedia content that is being presented, and information associated with a scene in a particular segment of the multimedia content that is being presented. In one exemplary embodiment, the communication unit is further configured to receive one or more of: a reward based on the obtained timing information, and an opportunity for purchasing an item based on the obtained timing information. In another exemplary embodiment, the above noted system further includes a remote server that includes the database. The remote sever further comprises a receiver configured to receive the transmitted user feedback and the associated timing information, a processor configured to process the feedback and the associated timing information to produce at least a portion of the response, and a transmitter configured to transmit the response from the database. In another embodiment, the above noted system further includes a third device that is configure to receive the response corresponding to feedback provided by the plurality of consumers of the multimedia content on a segment-by-segment basis.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Figure 1:
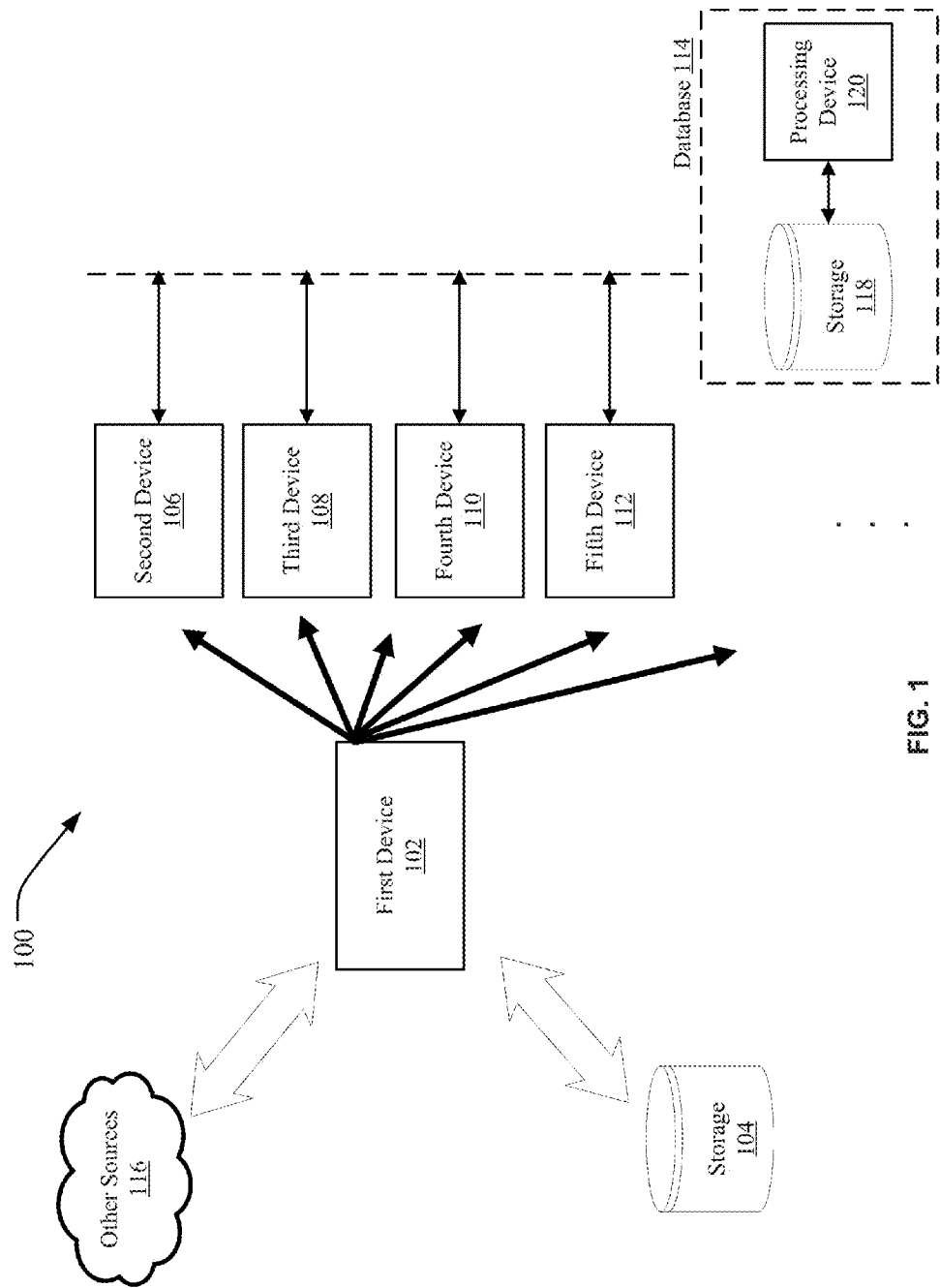
FIG. 1 illustrates a system that can accommodate certain disclosed embodiments.

FIG. 1 illustrates a system 100 that can accommodate the disclosed embodiments. The system 100 includes a first device 102 that is configured to present a multimedia content. The content can be an entertainment content, such as a movie or a TV show, a live broadcast, such as a political debate or a sporting event, a news program, an advertisement, and the like. The first device 102 can be coupled to, or include, a display screen, a projector screen, one or more speakers and the associated circuitry and/or software components to enable the reception, processing and presentation of a multimedia content. The first device 102 may also be in communication with a storage 104 unit. The storage 104 unit can be any one of, or a combination of, a local and a remote (e.g., cloud-based) storage device. The storage 104 unit can store a variety of multimedia content, meta data, applications, instructions, etc., which may be stored on magnetic, optical, semiconductor and/or other types of memory devices. The first device 102 may, alternatively or additionally, be configured to receive multimedia content and metadata through one or more other sources 116, such as through the Internet, through a terrestrial broadcast channel, through a cable network, through a home network (e.g., a Digital Living Network Alliance (DLNA) compliant network), through a wired or wireless network (e.g., a local area network (LAN), wireless LAN (WLAN), a wide area network (WAN) and the like). Such a media content can also be a real-time (e.g., streaming) content that is broadcast, unicast or otherwise provided to the first device 102. The received content can be at least partially stored and/or buffered before being presented by the first device 102.

Referring again to FIG. 1, at least a portion of the multimedia content that is presented by the first device 102 is received by at least one other device, such as the second device 106. At least a portion of the first media content that is presented by the first device 102 may be received by devices other than the second device 106 (if present), such as the third device 108, fourth device 110, fifth device 112, etc. The terms "secondary device" or "secondary devices" are sometimes used to refer to one or more of the second device 106, third device 108, fourth device 110, fifth device 112, etc. In some embodiments, additional systems similar to the system 100 of FIG. 1 can simultaneously access and present the same content. For example, the system 100 of FIG. 1 can reside at a first household while a similar system can reside at a second household, both accessing the same content or different contents) and presenting them to a plurality of devices or users of the devices.

One or more of the second 106, the third 108, the fourth 110, the fifth 112, etc., devices is in communication with a database 114. The database 114 includes one or more storage 118 devices for storage of a variety of multimedia content, meta data, survey results, applications, instructions, etc., which may be stored on magnetic, optical, semiconductor and/or other types of memory devices. The database 114 can, for example, include a remote (e.g., cloud-based) storage device. The database 114 can further include, or be in communication with, one or more processing devices 120, such as a computer, that is capable of receiving and/or retrieving information, data and commands, processing the information, data, commands and/or other information, and providing a variety of information, data, commands. In some embodiments, the one or more processing devices 120 are in communication with the one or more of the secondary devices and can, for example, send/receive data, information and commands to/from the secondary devices.

In one specific example, the first device 102 is a television set that is configured to present a video content and an associated audio content, and at least one of the secondary devices is a portable media device (e.g., a smart phone, a tablet computer, a laptop, etc.) that is equipped to receive the audio portions of the presented content through a an interface, such as a microphone input. In this specific example, each of the secondary devices can be further configured to process the captured audio content, process the audio content to detect particular information, such as identification information, synchronization and timing information, and the like, and to further present a variety of information and content to the user to enhance the viewing experience of the user. In other exemplary scenarios, one or more of the secondary devices are configured to receive at least a portion of the content presented by the first device 102: (a) by capturing a portion of the presented video, (b) through wireless transmissions (e.g., 802.11 protocol, Infrared transmissions, etc.) from the first device 102, and/or (c) through wired transmissions that are provided by the first device 102. These various transmission channels and mechanisms for conveying one or more segments of the content (or information such as time codes associated with the content) to the secondary devices are shown in FIG. 1 as arrows that originate from the first device 102 in the direction of the second 106, the third 108, the fourth 110, the fifth 112, etc., devices.

In some embodiments, one of the secondary devices is the source of multimedia content that is presented by the first device 102. For example, a wireless link can be established between the second device 106 and the first device 102 (or between the second device 106 and an auxiliary device, such as a tuner, a cable box receiver, and the like, in communication with the first device 102) in order to allow the first device 102 to receive the content from the second device 106 and to present the content to one or more of the third device 108, fourth device 110, fifth device 112, etc.

Figure 2:
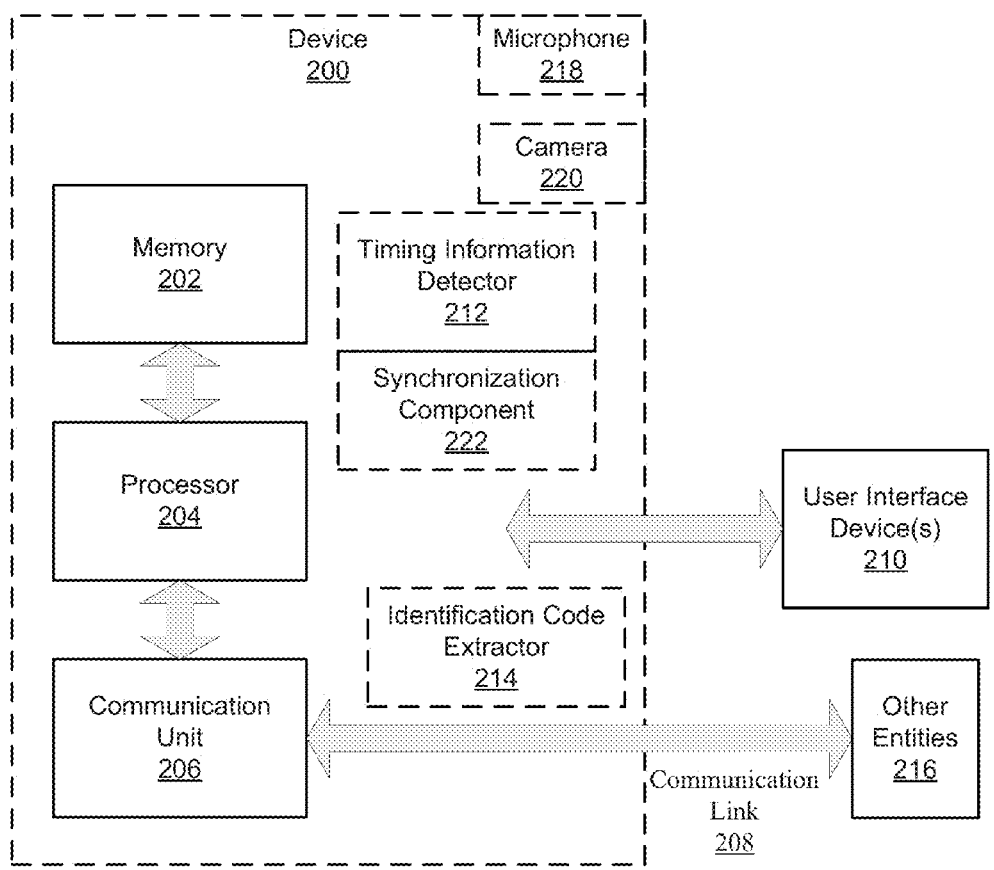
FIG. 2 illustrates a block diagram of a device within which certain disclosed embodiments may be implemented.

FIG. 2 illustrates a block diagram of a device 200 within which certain disclosed embodiments may be implemented. The exemplary device 200 that is depicted in FIG. 2 may be, for example, incorporated as part of the secondary devices that are illustrated in FIG. 1. The device 200 comprises at least one processor 204 and/or controller, at least one memory 202 unit that is in communication with the processor 204, and at least one communication unit 206 that enables the exchange of data and information, directly or indirectly, through the communication link 208 with at least other entities, devices, databases and networks (collectively illustrated in FIG. 2 as Other Entities 216). The communication unit 206 of the device 200 can also include a number of input and output ports that can be used to receive and transmit information from/to a user and other devices or systems. The communication unit 206 may provide wired and/or wireless communication capabilities in accordance with one or more communication protocols and, therefore, it may comprise the proper transmitter/receiver antennas, circuitry and ports, as well as the encoding/decoding capabilities that may be necessary for proper transmission and/or reception of data and other information. In some embodiments, the device 200 can also include a microphone 218 that is configured to receive an input audio signal.

In some embodiments, the device 200 can also include a camera 220 that is configured to capture a video and/or a still image. The signals generated by the microphone 218 and the camera 220 may be further undergo various signal processing operations, such as analog to digital conversion, filtering, sampling, and the like. It should be noted that while the microphone 218 and/or camera 220 are illustrated as separate components, in some embodiments, the microphone 218 and/or camera 220 can be incorporated into other components of the device 200, such as the communication unit 206. The received audio, video and/or still image signals can be processed (e.g., converted from analog to digital, color correction, sub-sampled, evaluated to detect embedded watermarks, analyzed to obtain fingerprints etc.) under the control of the processor 204. In some embodiments, instead of, or in addition to, a built-in microphone 218 and camera 220, the device 200 may be equipped with an input audio port and an input/output video port that can be interfaced with an external microphone and camera, respectively.

The device 200 is also coupled to one or more user interface devices 210, including but not limited to a display device, a keyboard, a speaker, a mouse, a touch pad, a motion sensors, a physiological sensor, and the like. The user interface device(s) 210 allow a user of the device to input information, such as feedback regarding the presented first content, and to receive information from for, example, the database 114. While in the exemplary block diagram of FIG. 2 the user interface devices 210 are depicted as residing outside of the device 200, it is understood that, in some embodiments, one or more of the user interface devices 210 may be implemented as part of the device 200. Moreover, the user interface devices may be communication with the device 200 through the communication unit 206.

The device 200 also includes a timing information detector 212 that is configured to obtain timing information associated with the content that the device 200 is exposed to. For example, the timing information detector 212 can include a watermark extractor that is configured to detect watermarks that are embedded in an audio, video, or text components of a multimedia content, and to, for example, obtain timing information and content identification information from the embedded watermarks. The timing information detector 212 can include a fingerprint computation component that is configured to compute fingerprints for received segments of multimedia content (or components therein) and to communicate the computed fingerprint values (e.g., through the communication unit 206) to a fingerprint database for obtaining timing information and/or content identification information.

The device 200 also includes a synchronization component 222 that is configured to at least synchronize or associate the feedback that is received from a user of the device 200 with the timing information that is obtained by the timing information detector 212. The device 200 can also include an identification extractor 214 that is configured to determine identification information associated with the content that is being presented to, or is accessible by, the device 200. Further details regarding timing and synchronization operations, as well as extraction of identification information are discussed in the sections that follow. It should be noted that while the timing information detector 212, the synchronization component 222 and the identification code extractor 214 are illustrated as separate components in FIG. 2, one or more of these components can be combined together and/or implemented as part another component of the device 200.

Referring back to FIG. 1, in some exemplary embodiments, a content that is presented by the first device is presented to one or more users of the secondary devices. For example, the content is presented by a television set (first device) to a user that is possession of a handheld device (second device), such as a smartphone. The second device is capable of determining synchronization and timing information associated with the presented content and to enhance the viewing experience of the user based on, for example, the feedback that it receives from the user and/or other users or consumers of the content. Generally, the multimedia content that is perceived by the user must be long enough to allow the user to form an opinion about the content and provide a feedback that is captured through the second device. The second device is configured to allow the input to be associated with corresponding segments of the content with a particular (and, e.g., adjustable) temporal granularity.

The second device can detect multimedia content timeline through various synchronization (sync) channels. In one example, the first device accesses the content over a wireless local area network and the second device monitors the wireless link and extracts time codes that indicate content timeline. For example, time codes can be multiplexed with multimedia content data in order to facilitate proper timing of audio and visual components during playback of the content. In one example, SMPTE timecodes are used.

In another example embodiment, the content is played from a media player, where the storage format of the content includes specially designed codes that facilitate access to the media timing information. For example, the content is a Blu-ray content that conforms to the Blu-ray disc-Java (BD-J) specification. The BD-J specification allows special codes for synchronization of the content to specific frames in the content. For instance, there are two types of video synchronizations allowed, one called "loose synchronization," which uses a call back method and is accurate to within several frames of the event, and the other being "tight synchronization," which allows applications to synchronize accurately to the exact frame using time codes. The BD-J format allows communication of the content to the second device over, for example, a Wi-Fi network to provide content timeline information. The BD-J code can monitor time code data multiplexed with content data and communicate it to the second device on the Wi-Fi channel established for this purpose. Besides the time codes, additional data may be communicated, such as content identification (content ID), as well as user input through remote control devices.

In another example embodiment, the second device is equipped with a microphone that is configured to receive an audio portion of the content that propagates through air before reaching the microphone input. In one variation, the audio signal may be coupled from the first device to the second device using a wired audio connector that is, for example, connected from an "audio-out" port of the first device to an "audio-in" port of the second device. The second device can then analyze the received audio to extract particular innate characteristics of audio signal. This operation is referred to as computing a fingerprint of the audio content and it usually includes analyzing the content on a segment-by-segment basis to obtain a computed fingerprint for each content segment. This operation is typically carried out once to populate a fingerprint database that also includes additional content information, such as content identification information, ownership information, copyright information, and the like. When a plurality of audio segments are received at the second device, fingerprints are computed for the received audio segments and compared against the fingerprints that reside at the fingerprint database to obtain content timeline information. For instance, the location of each received content segment within the lager content can be determined.

Additionally, or alternatively, if the received audio segments at the second device include embedded watermarks that provide timeline information, such watermarks can be extracted by the second device to obtain the needed timeline information. Such watermarks, which are substantially imperceptibly embedded into the audio content, can further include identification information to identify the content. Alternatively, or additionally, watermarks that are embedded in the video portion of the content that is received and captured by the second device can be used for extraction of timing information.

The second device may determine the timing and synchronization information from one or more of the above described techniques and can, therefore, have one or more sync channels at its disposal. In some exemplary embodiment, if more than one sync channels is available, the second device selects a particular sync channel based on a predefined ranking, a reliability measure associated with the sync channels, instructions from the user and/or a combination thereof. In some embodiments, even after the timing and synchronization information is obtained, the second device can continue searching for timing information using one or more sync channels in order to detect when the content playback is paused or changed, such as when next/previous chapter, fast-forward/rewind operations are carried out, or the when a new content is presented (e.g., when the user switches to a different TV channel). If no sync data is obtained for an extended period of time, the second device can inform the user and/or the database that synchronization is lost.

In addition to obtaining synchronization information corresponding to the content timeline, it is desirable for the second device to identify the content. Content identification allows different contents to be distinguished from one another. In some embodiments, at least one of the sync channels is used to explicitly carry content ID information in addition to the synchronization information. For example, as noted above, embedded watermarks can carry both content ID data and timing information.

In some embodiments, content ID information is implicitly included in the synchronization data. For example, during live broadcasts of a multimedia content, the timing information can be the timeline that continuously progresses as the content is being presented. Such a timeline can continue across the boundary of distinct contents, such as a series of advertisements that are interspersed among segments of the live content. Subsequently, individual content segments of the presented content can be linked to a particular time interval and identified based on the time code by accessing a database, such as a TV guide and/or an advertiser's or broadcaster's schedule.

In some applications, manual identification of the content based on, for example, audio and/or visual inspection of the content, can be carried out. However, in some applications, it is more advantageous to automatically identify the content. In one example embodiment, content identification is carried out automatically based on matching the computed content features to predefined templates (in cases where fingerprinting techniques are used) and/or obtaining content identification through content ID data of extracted watermarks (in cases where embedded watermarks carry content ID information). Since watermarking provides a low-capacity data communication channel, it is rare that the embedded watermarks have the capacity to carry actual name or owner of the content. Instead, these watermarks often include a serial number (i.e., a number in the range 0 to $(2^n-1)$, where n is the number of bits carried in the content. ID portion of the watermark payload) that can be used to uniquely identify a content by, for example, accessing a database that maps the serial number to a particular content. Alternatively, or additionally, in some embodiments, the content may be identified using the parameters that were used for embedding those watermarks. In particular, each watermark opportunity within a content can be identified using a number of parameters, such as frequency band of embedding, watermark embedding algorithm, noise-like carrier sequence used for embedding, watermark bit rate, etc. These parameters are collectively called the 'embedding stego key." Each content can be embedded using a particular embedding stego key. Once such a content is received and examined to extract the embedded watermarks, the embedding stego key can be recognized and used to identify the content.

In some example embodiments, it is advantageous to identify a target content before the playback is commenced. In these applications, the content may be initially identified using a file header, a schedule (e.g., a TV guide), and the like.

The second device further provides evaluation tools to the user. The evaluation or feedback is any input that reveals user's opinion or comments about the content at a particular moment. The evaluation tools use one or more input technologies available on the device, including, but not limited to, a touch screen, an audio input (e.g., voice command), a video input, inertial sensing, physiological (e.g., biometric) sensing, an input from a gyroscope and/or accelerometer, and others. The user interface provides an easy-to-use mechanism for entering a response or providing a feedback. For example, a positive response to the content can be provided by an upward motion, a plus sign, touching a green field on a user interface or a thumb up sign, and the like. A negative response can be represented by a sideway motion, a minus sign, touching a red field or a thumbs down sign, and the like. The user interface of the disclosed embodiments further allows the user to provide a response without distracting the user from his/her primary activity of viewing the content, even if the feedback is entered multiple times over the course of the content or over the user viewing session. For example, a user may communicate his/her opinion conveniently using a touch screen, where tapping on the touch screen or swiping up and down indicates approval, while swiping left and right indicates disapproval. Repeated tapping or swiping may indicate strong approval/disapproval. Similarly the user may provide the input in a similar fashion using a mouse, or use the up/down/left/right keys on a keyboard, etc., to convey his/her opinion based on the tools available to the second device. User input may comprise involuntary reactions such as heart rate, sweating, breathing rate, or pupillary response. Note that all of these inputs can be executed without diverting the user's gaze from the screen on which the content is displayed.

In some embodiments, alternatively, or additionally, the user interface comprises a motion sensor that is configured to detect the user's motions, which are indicative of the user's opinion regarding the content segment(s) that are being perceived at that moment. Different types of motions may be detected to signify positive or negative user opinion. For example, an up-and-down motion may signify a positive opinion, and a sideways motion may signify a negative opinion. Such motions can be detected using a motion detection device that operates based on, for example, changes in a received electromagnetic radiation (e.g., motion sensors based on infrared technologies), based on detection of rotation of a device (e.g., gyro-based techniques) and/or based on detection of changes in acceleration (e.g., accelerometer-based techniques). The motion sensors can be included as part of the second device, which enables the user to provide evaluation feedback by moving the second device, or can be incorporated into separate devices (e.g., a handheld device) that are in communication with the second device. Alternate versions of the evaluation tools may include multiple choice keys or sliders that communicate quasi-continuous values indicative of approval/disapproval, like/dislike, good/bad, correct/wrong, etc., scales. Depending on the extent of feedback and the form of user interface, in some instances, only a brief interruption in content viewing may be needed to execute content evaluation.

In some embodiments, the input received from the second device's sensors are additionally, or alternatively, processed to extract a response from user's utterings, actions, or gestures. In this context, the user interface can include, or be communicatively connected to, one or more input devices and/or sensors. In one example, the device's microphone receives an audio signal that corresponds to an uttering by the user. The received audio signal is then processed to recognize utterances of approval and disapproval, or specific noises such as applause or shouts of "boo" from an unhappy audience. Even if the user reaction cannot be clearly categorized into positive and negative type, the presence or absence of a reaction can be interpreted as significant or insignificant for the corresponding content segment. In other example embodiments, user's gestures, body motions, postures, facial impressions, and the like, can be captured using a video camera that is in communication with, or is part of, the second device. The captured video signal (and/or still images) can then be analyzed to discern user's feedback associated with particular segments of the presented content.

When a user communicates his/her evaluation of the content (e.g., his/her opinion or reaction) to the second device, this evaluation together with the timing of the evaluation with respect to the content timeline (e.g., a content time stamp) is communicated to a database using one or more of data communication channels. In one example, the database is associated with an Internet site known to the second device, and the communication is executed by connecting the second device to the Internet and transmitting the user's feedback and the associated content timing information to the database. The database receives and stores content evaluation input from multiple users. The database may also filter user inputs prior to the storage. For example, user input received while detected content playback duration is shorter than a predefined time interval may be considered an invalid input and filtered out. Alternatively, the number of inputs from the same source may be limited. One of the objectives of this filtering is to detect and prevent user's attempt to skew or corrupt the evaluation statistics.

Communications from the second device to the database may include additional information beyond user's opinion and content timing information. In one example embodiment, the second device's IP address is communicated to the database. This IP address may be used to link different user opinions over the course of one or more viewing sessions in order to analyze user's preferences. Alternatively, or additionally, a user may choose to communicate his/her identity to the database so that user preferences can be known even if the user decides to use a different device or IP address for providing feedback. Additionally, content identification information may be communicated to the database. As noted earlier, content ID can be established by the second device through the sync channel(s), through the use of watermarks or fingerprints, through manual provision of the content identification (e.g., content name) and/or other techniques. As also noted earlier, content ID may be implicitly established through the use of content time stamps.

Additionally, the information provided to the database can include information indicative of the duration of the content viewing prior to the evaluation entry as established by the sync channel. This information may be used to qualify the evaluation entries, and, for example, to allow only those that are associated with viewing durations that exceed a predetermined threshold. In some embodiments, additionally, or alternatively, the received evaluations can be scaled based on the duration of viewing such that, for example, evaluations that correspond to longer viewing durations are given a lamer weight or scaling factor than the ones that correspond to shorter viewing durations. These operations that are carried out for qualifying the received evaluations can reduce or eliminate the chances of intentional manipulation of the evaluation statistics.

In some embodiments, the second device may communicate the content ID and timing information to the database whenever synchronization is established and lost, even in the absence of user evaluation input. This information can be used to qualify (e.g., accept or discard) user evaluation entries, and/or to measure audience participation or viewing habits (e.g., for audience measurement purposes). Also the information associated with the establishment and loss of synchronization can be construed as one type of user feedback. For example, a loss of synchronization and subsequent synchronization to a later segment of the same content can be associated with a fast-forward (or rewind) operation, indicative of user's disapproval (or interest, in case of rewind) of certain segments of the content but still an overall interest in that content. In contrast, a loss of synchronization and subsequent synchronization to a another content can be associated with a change of channel operation, indicative of user's disapproval of the content.

Furthermore, the second device may communicate to the database certain details regarding sync channel(s) used to obtain content timing information. These details may be useful to establish reliability and precision of the timing information. In one example embodiment, if reliability and precision of timing information is deemed low, it is discarded in favor of extrapolating previous timing information with high precision and reliability. In another embodiment, if all timing information from given user has low precision and reliability, the filtering rules are relaxed, and user input is accepted although it was not associated with playback duration of sufficient length.

Furthermore, these details about the sync channel(s) may be used to establish content ID. For example, digital watermarks obtained from an audio portion of the content, as well as parameters used in embedding those watermarks (i.e., the embedding stego key) can be used to identify the content.

In some embodiments, the user may provide additional input such as personal comments, responses to comments by another user, hyperlinks to interesting and relevant information, and the like. In one exemplary embodiment, content timeline is illustrated on the screen of the second device with salient points highlighted, so that the user can associate comments with the content timeline. The presentation of additional input data can occur in continuity with content evaluation session, or independently after the content is consumed, providing that the user consumption of the content and participation in the evaluation process can be authenticated based on IP address of the device, user ID and/or password entry, or other techniques.

In response to user evaluation entry to the database, the database provides an evaluation response. In some embodiments, such a response provides positive incentives (e.g., rewards) to the users to encourage their participation. In one example, a response is provided to the first input provided in each viewing session (e.g., in each viewing of a particular content), while additional responses to subsequent user inputs may or may not be provided.

One exemplary type of evaluation response comprises an aggregated information or statistical summary of content evaluations provided by a plurality of users as a function of timeline. In case of live broadcasts, the aggregated information or statistical summary may correspond to segments of the content that has been already presented, while in case of pre-recorded content, the aggregated information or statistical summary may correspond to content segments that have already been presented as well as yet-to-be presented content segments. An objective of such a response is to present the user with a rating or value of the content as a function of time as perceived by other users, and to allow the user to make informed decision as to whether or not continue viewing the content, whether or not to rewind or pay closer attention to segments that the user might have missed, whether or not to skip to some future salient points, etc.

Figure 3:
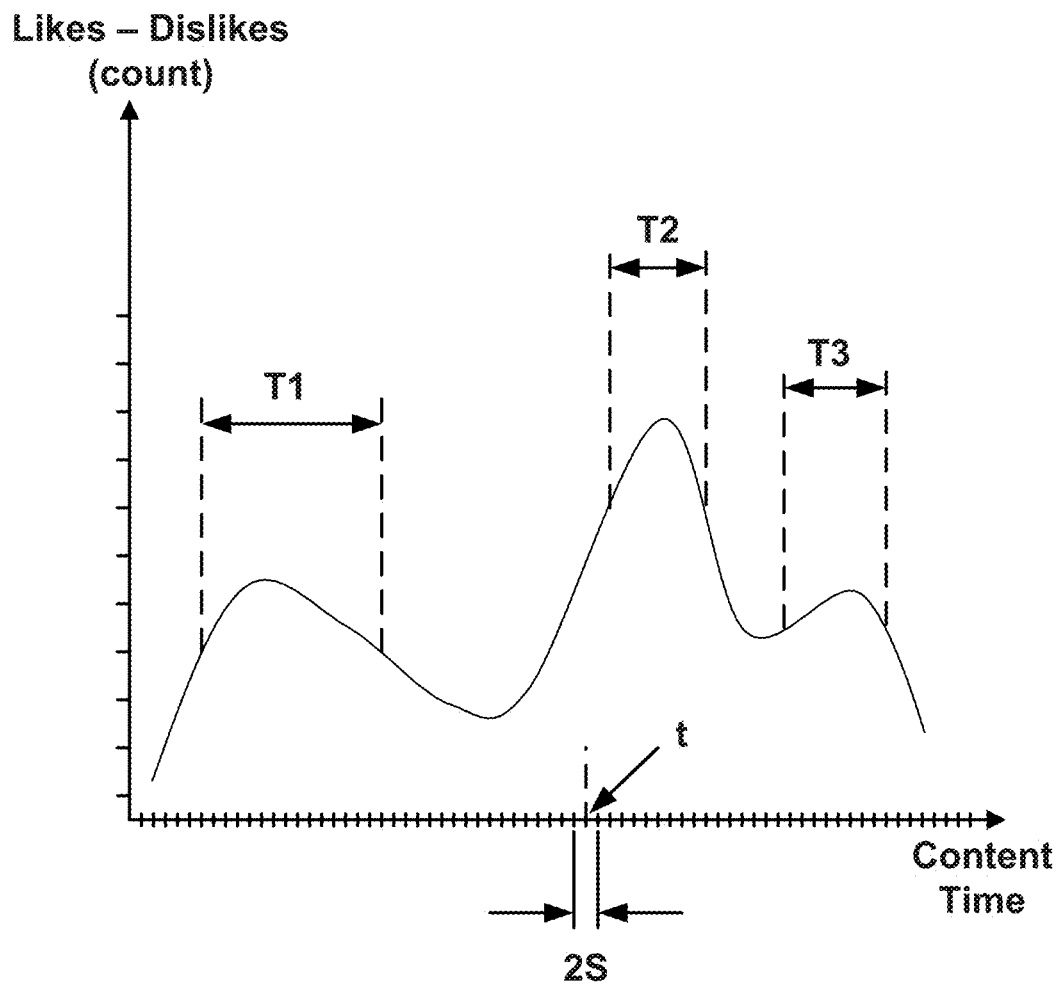
FIG. 3 illustrates an exemplary response provided on a user device in accordance with an exemplary embodiment.

The aggregated information or statistical summaries can be presented as a graph where the x-axis represents the timeline of the content and the y-axis is the count of user entries of a particular type (e.g., "likes") received in each time interval $[t-s, t+s]$, where t is a value on the timeline and s is a predefined small value, such as one second. FIG. 3 illustrates a plot of evaluation feedback computed as the number of likes minus the number of dislikes versus content timeline in accordance with an exemplary embodiment. FIG. 3 illustrates sharp peaks during three time periods, T1, T2 and T3. The peaks illustrate that other viewers have found these sections particularly interesting. FIG. 3 only provides a simple plot to facilitate understanding of the underlying concepts. It is, however, understood that other types of plots or data can be presented to the user in accordance with the disclosed embodiments. For example, the presented data can be normalized to fall within a particular scale (e.g., 0 to 10), can include standard deviations and confidence markers, can be color-coded to present easily discernible salient points (e.g., interesting versus boring content segments), and the like. In some examples, the content timeline is divided into a sequence of intervals of duration T, e.g. T=1 s, and the y-axis corresponds to the count of user entries of particular type during each of the intervals. Different entry types may be presented simultaneously on the same graph or on distinct graphs. In some examples, user entries are represented by numbers, e.g. "like" is "+1" and "dislike" is "−1" and the y-axis can represent the sum of user inputs within the time interval specified above. The presentation of statistics can be further enhanced if the user has sliders or other tools to express an intensity of the opinion, thus enabling the presentation of content evaluation with better granularity and dynamic range (on the y-axis).

In the case of prerecorded content, the aggregated information or statistical summaries can be carried from one release phase of the content into another release phase. For example, a particular movie may be first released as a video-on-demand (VOD) content. During the VOD release phase, user opinion statistics are collected and subsequently presented to viewers when the content is released on regular cable or network television broadcasts. Similarly, statistics collected during the time when the content is released on DVD/Blu-ray discs can be used to present information to users during broadcast TV of the same content.

In some embodiments, a participating user may be presented with basic evaluation information as soon as he/she enters the first evaluation input. Alternatively, for prerecorded content, evaluation information can be viewable prior to the user's viewing, to assist the user in content selection, or after viewing the content for research, review, and the opportunity to add and modify evaluations, add comments, respond to other user's comments, etc.

In one exemplary embodiment, the collected information during viewing of the content by a first user is used to allow an abbreviated viewing of the content by a second user. For example, the first user may watch a live baseball game using a viewing system equipped with a digital video recorder (DVR). The first user provides his or her feedback for particular segments of the game as the game is being televised and recorded by the DVR. The feedback is then provided to a second user (e.g., another member of the same household), who intends to view the recorded game at a later time. The second user can utilize the feedback from the first user to watch only certain segments of the recorded baseball game that were considered interesting by the first user (e.g., a "highlights-only" content) rather than viewing the entire game. The feedback provided to the second user can be obtained from a plurality of users, such as friends of the second user, users having a common interest in baseball, baseball experts, and the like. Similar operations can be carried out to provide parental control, where, for example, a parent input can be used to allow subsequent viewing of a redacted version of the content by children in the same household.

The evaluation information may be comprehensive; that is, the aggregated information or statistical summaries can be compiled using all available user input. Alternatively, the evaluation information may be created using a subset of user feedbacks. For example, the participating user may decide to view only statistics of opinions provided his friends from a social media site. Alternatively, the user may choose to view statistics of opinions collected from users within a particular region, from a user-declared gender group and/or age group, from users with specific preferences, or based on user profile features derived from past evaluations. In some embodiments, more comprehensive and/or selective evaluation information are offered if the user meets additional criteria. For example, more comprehensive evaluation information is made available only if the user has viewed at least a significant portion of the content and/or after the user has provided additional information to the user profile.

Beyond evaluation information, the responses provided to the users may include additional informative and/or entertaining content. For example, background information about the characters or the displayed scenes can be presented to the user on the second device. This additional information is associated with the current content that is being presented by the first content, and is enabled through one or more content sync channels that were described earlier. Moreover, accessing this information doesn't require a significant effort by the user.

In order to facilitate access and presentation of information linked to specific content segments, the database includes an association between the content timeline and the content metadata related to a particular moment or immediately preceding the particular moment within the content. The metadata may include names of the actors, location of events, music score title, names of significant animals or objects, etc., associated with the content timeline. In one embodiment related to pre-recorded content, content segments are subjectively evaluated through audiovisual inspection and manual database population with relevant data. In another embodiment, automatic tools are deployed to recognize faces and/or objects within the content and to link the recognized faces and/or objects to the content timeline. The use of automatic tools are particularly advantageous when the content is present as a live broadcast since subjective association tools may introduce unwanted delays.

Time-varying evaluation of the content provides valuable information for content creators, owners, distributors or advertisers, as well, since this information can be used to improve future content design, to edit content for the next release window, to identify compelling segments for marketing and promotional purposes, to judge contributions of different participants in the content creation process, to cite favorable evaluations in advertising campaigns, and other uses. These benefits incentivizes the content creators, owners, distributors or advertisers to facilitate the collection of user feedback by, for example, embedding watermarks with timing information into audio components of their content, or to offer additional rewards to participating users.

Beyond the above-described informative data that is presented to the users, the responses provided to the users may include other, more direct rewards and incentives, such as allowing user to view additional content, providing prizes that are tailored to user preferences expressed through evaluation process, participating in a lottery for more expensive prizes, providing point awards that are accumulated over multiple viewing sessions, and the like. Those incentives may be conditioned upon complete (or partial) viewing of the content and providing the needed feedback, as, for example, established through sync channel monitoring, or can be conditioned upon user's adherence to a proper evaluation protocol. Moreover, special rewards can be offered to users that participate in content evaluation early, and provide good prediction of user responses over longer period of times. Those users may be offered access to new content prior to general release in order to create initial time varying evaluation of audiovisual content (e.g., prior to the general release).

In addition to rewards and incentives provided to the user, the database may provide monetizing responses to the user, as well. Such a monetizing responses, for example, enables the content provider, the broadcaster, a third party, etc., to present purchasing opportunities to the user. In one example embodiment, based on the user input, the database provides recommendations for purchase of additional content that match the user's preferences. Additionally, evaluation responses may contain purchase offers that are related to content moments that are currently being presented on the first device, as established through the one or more sync channels. For example, if the presented content segment includes certain brand or type of clothing, the user is presented with an opportunity to purchase the same brand/type of clothing using the second device. To minimize user's distraction and to promote such monetary transactions, monetizing responses can be carefully designed and balanced with a variety of rewards and incentives.

In some embodiments, in addition to providing evaluation responses to the users and/or content creators, content owners and advertisers, the database can be used for data-mining purposes. For example, the information at the database can be used to compare the overall popularity or level of user interest in different contents, as well as in different actor performances. Data-mining can be used to correlate user preferences across different contents in order to better understand user behavior and wishes. For example, in case of a live broadcast of a political debate, the database can provide information about performance of individual politicians as a function of time, in real time. In such scenarios, by utilizing the timing information that is obtained through the sync channels (i.e., timing information that is based on content timeline rather than an absolute time measurement), variations in propagation delays, buffering delays prior to retransmission (e.g. in IPTV), delays due to transcoding operations, different delays associated with censorship, etc., across multiple distribution channels are mitigated. Furthermore, the timing information and the associated feedback obtained from the user can be collected during delayed viewings of a content. As such, the use of timing information in accordance with the disclosed embodiments enables collection of feedback from a larger group of users, and is effected with enhanced reliability and accuracy.

Since user evaluations received at the database can affect other users' decisions as to how to consume the content, or the decisions of content owners, distributors and/or advertisers on how to treat the content, it is important to ensure the integrity of the content evaluation process. In some embodiments, the application that provides user feedback on the second device is tamper resistant and includes authentication procedures when communicating with the database. Further, communications with the database can be encrypted to prevent interception and manipulation of the messages to/from the database. The sync channels are also designed to be robust to manipulation and forgery by, for example, using a proprietary watermarking technology to embed time codes, or information that can be used for synchronization purposes.

Figure 4:
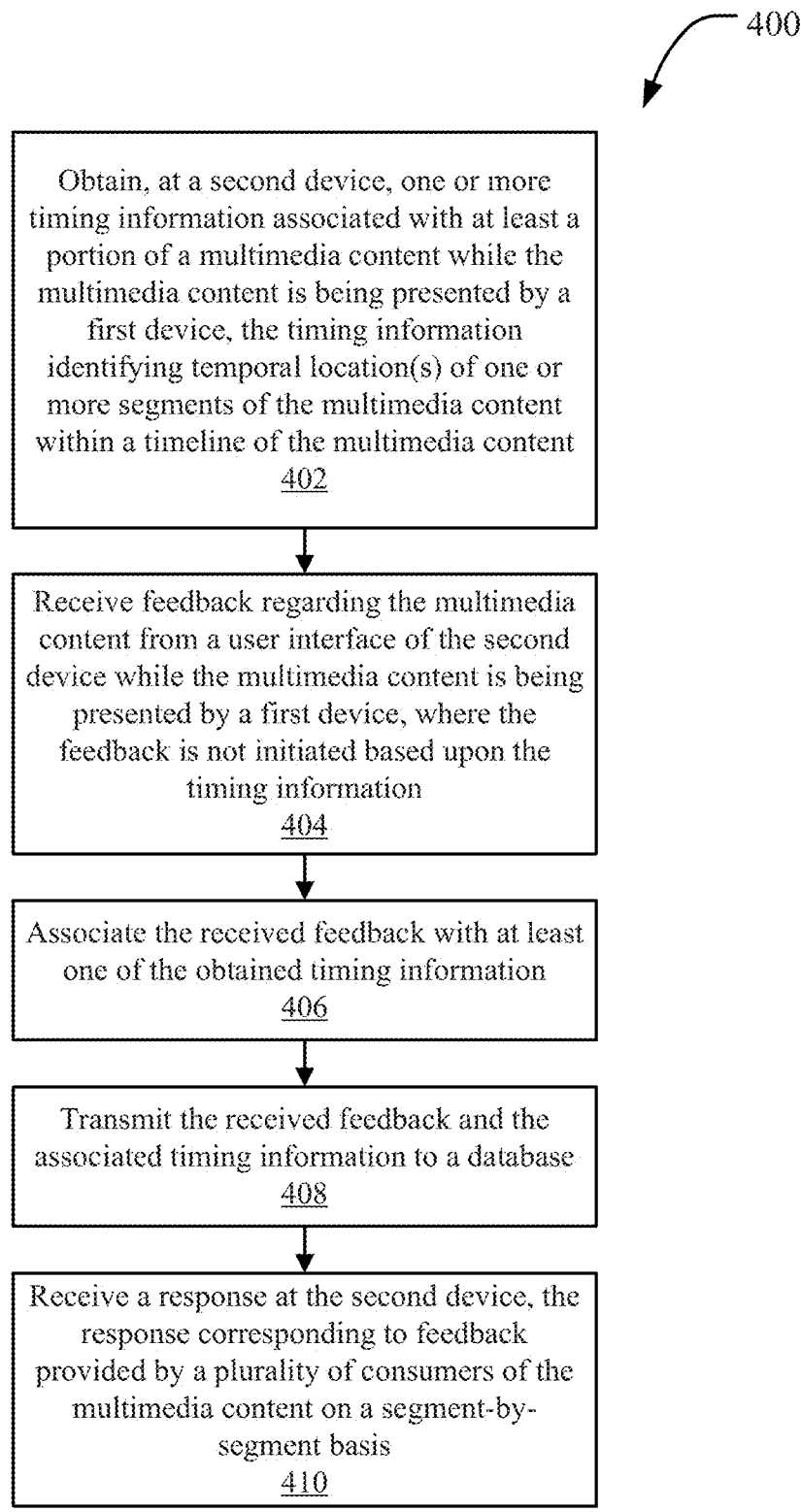
FIG. 4 illustrates a set of operations that may be carried out in accordance with an exemplary embodiment.

FIG. 4 illustrates a set of operations 400 that can be carried out in accordance with an exemplary embodiment. The exemplary operations 400 can be carried out at, for example, one of the secondary devices that are illustrated in FIG. 1. At 402, one or more timing information associated with at least a portion of a multimedia content is obtained at a second device while the multimedia content is being presented by a first device. One or more portions can span one or more segments of the multimedia content and can include, but is not limited to, one or more of an acoustically propagated audio portion, an optically propagated video/image portion, a portion of the multimedia content that is in a suitable format for wireless transmission, etc. The timing information identifies temporal location(s) of one or more segments of the multimedia content within a timeline of the multimedia content. At 404, feedback regarding the multimedia content from a user interface of the second device is received while the multimedia content is being presented by a first device. A user or consumer of the multimedia content can provide a feedback at any time (e.g., spontaneously) during the presentation of the content without having to wait for specific time frames, or having to be prompted for input. As such, the feedback is not initiated or triggered based on the timing information that is obtained at 402. These features of the disclosed embodiments, enable the use of user feedback tools such as touch screen fields (or screen touch interpreters), motion sensor interpreters, physiological sensors, speech recognition tools, etc., that are not content specific (i.e. they aren't varying from content to content or from one portion of content to another), This property of feedback tools is essential to achieve simple, non-distracting collection of time-varying evaluation of audiovisual content from general public.

At 406, the received feedback is associated with at least one of the obtained timing information. For example, the timing information can be a time stamp that identifies the temporal position of a particular segment of the multimedia content. The association of the time stamp and the feedback thus correlates or links the received feedback to that particular time stamp (or content segment). At 408, the received feedback and the associated timing information is transmitted to a database, such as database 114 that is depicted in FIG. 1. At 410, a response from the database is received at the second device. The response may comprise time-varying evaluation of the content that corresponds to feedback provided by a plurality of consumers of the multimedia content on a segment-by-segment basis. Such time-varying information can, for example, be displayed in the form of a graphical representation on the display at a device, such as the second device. As such, a user of the multimedia content can have ready access to evaluations of the content on a segment-by-segment basis.

It should be noted that after the completion of step 408, the response, such as time varying evaluation of the content, is transmitted by the database (e.g., by the processing and transmission components therein) to a device, such as the second device.

Figure 5:
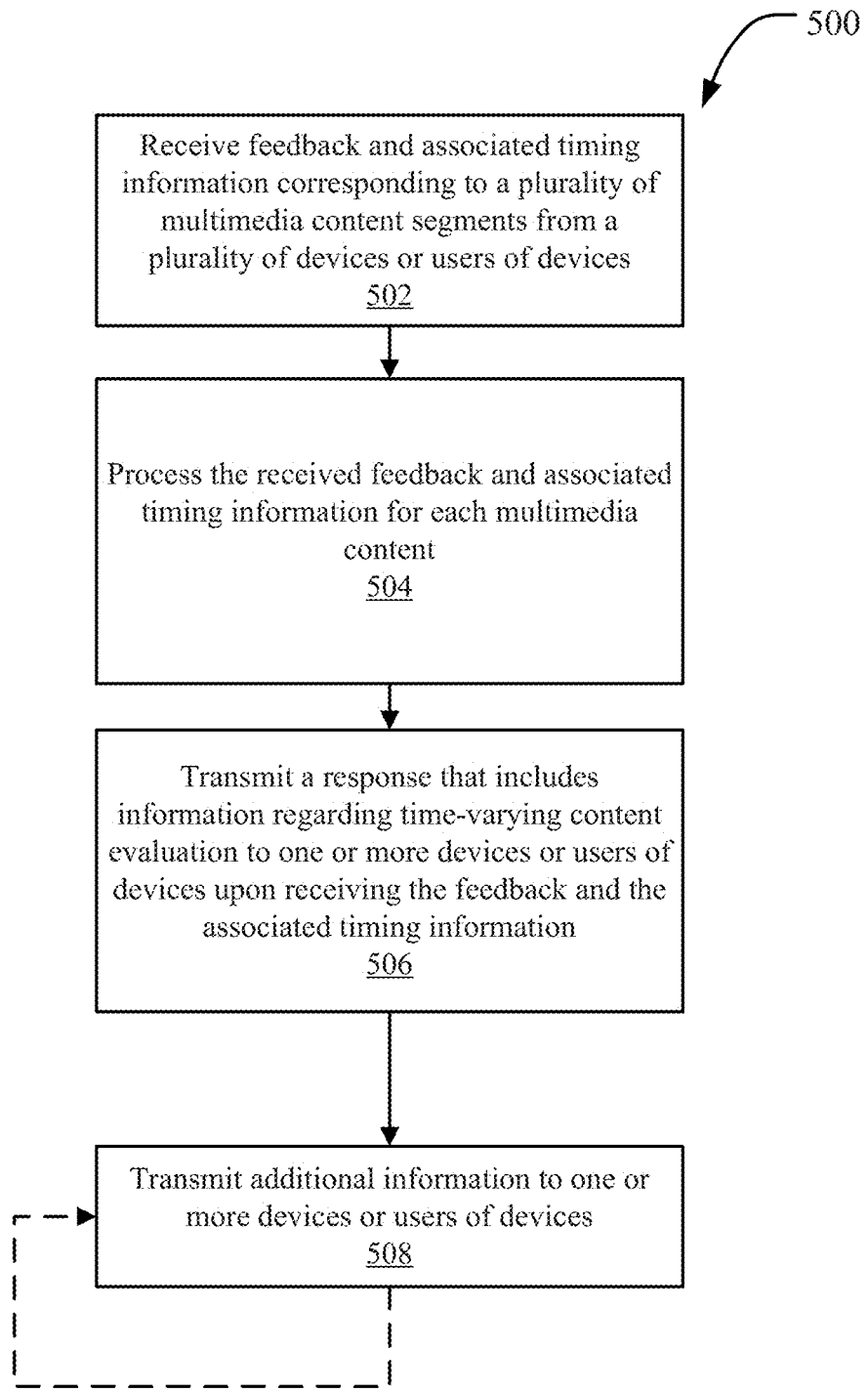
FIG. 5 illustrates a set of exemplary operations that can be carried out for providing data about time-varying content evaluation in accordance with an exemplary embodiment.

FIG. 5 illustrates a set of exemplary operations 500 that can be carried out for providing the data about time-varying content evaluation in accordance with an exemplary embodiment. The operations 500 can be carried out at, for example, the database 114 that is illustrated in FIG. 1. At 502, feedback and the associated timing information corresponding to a plurality of multimedia content segments are received from a plurality of devices and/or users of devices. The received information can correspond to the same content (e.g., a broadcast TV program) that is being viewed by a plurality of users or to different multimedia content that is being viewed by a plurality of users. At 504, the received feedback and the associated timing information is processed for each multimedia content. Such processing can, for example, include, identifying the content, determining whether the received feedback meets certain qualifications, analyzing synchronization successes and failures received from a particular user for a particular content, combining evaluation feedback received from multiple users for each segment of the content, producing aggregated results and statistical summaries, and the like. At 506, a response that includes information regarding time-varying content evaluation is transmitted to one or more devices or users of devices. Such information relates to an assessment of the multimedia content on a content segment-by-segment basis and can include statistical information about the content or content segments. The response at 506 is transmitted upon receiving the feedback and the associated timing information (e.g., after the operations at 504 are completed).

At 508, additional information may be transmitted to the one or more devices or users of the devices. This additional information can include information about characters that appear in the multimedia content, scenes that are presented in the content, rewards or incentives to the user, opportunities for the users to purchase items, and the like. In some example embodiments, the transmission of the response at 506 only occurs once for each particular content after receiving a first feedback from a device or user of the device. In other example embodiments, additional feedback and timing information is received, and subsequent responses at 506, or additional information at 508, can be provided to the device or the user of the device. As indicated by dashed arrow that leaves and re-enters the box with reference numeral 508, multiple additional information items can be transmitted after a single or multiple feedbacks.

It is understood that the various embodiments of the present disclosure may be implemented individually, or collectively, in devices comprised of various hardware and/or software modules, units and components. In describing the disclosed embodiments, sometimes separate components have been illustrated as being configured to carry out one or more operations. It is understood, however, that two or more of such components can be combined together and/or each component may comprise sub-components that are not depicted. Further, the operations that are described in the present application are presented in a particular sequential order in order to facilitate understanding of the underlying concepts. It is understood, however, that such operations may be conducted in a different sequential order, and further, additional or fewer steps may be used to carry out the various disclosed operations.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

A content that is embedded with watermarks in accordance with the disclosed embodiments may be stored on a storage medium or transmitted through a communication channel. In some embodiments, such a content that includes one or more imperceptibly embedded watermarks, when accessed by a content handling device (e.g., a software or hardware media player) that is equipped with a watermark extractor and/or a fingerprint computation component, can trigger a watermark extraction or fingerprint computation process to trigger the various operations that are described in this application.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for receiving consumer-generated information regarding a multimedia content, comprising:
    obtaining, at a second device, timing information associated with at least a portion of the multimedia content while the multimedia content is being presented by a first device, the timing information identifying temporal location(s) of one or more segments of the multimedia content within a timeline of the multimedia content, wherein the timing information is produced from extraction of one or more watermark messages that include the timing information associated with the one or more segments of the content;
    receiving feedback regarding the multimedia content from a user interface of the second device while the multimedia content is being presented by the first device, wherein the feedback is received independently from the timing information;
    using the timing information obtained from the one or more watermark messages to associate the received feedback with the one or more segments of the multimedia content;
    transmitting the received feedback and information indicative of association of the received feedback with the one or more segments on the timeline of the multimedia content to a database; and
    receiving a response from the database while the multimedia content is still being presented by the first device, the response comprising information regarding one or more segments of the multimedia content, the response having been produced from information received from a plurality of consumers of the multimedia content on a segment-by-segment basis and the information received from the plurality of consumers having been processed to obtain an aggregated result for each of the one or more segments of the multimedia content.

2. The method of claim 1, wherein the response includes a graphical representation of a rating value of the multimedia content on a segment-by-segment basis as a function of timeline of the multimedia content.

3. The method of claim 2, wherein the graphical representation includes identifiable salient points along the timeline of the multimedia content.

4. The method of claim 2, further comprising providing one or more controls to allow varying one or more of: a granularity of the timeline of the graphical presentation or a dynamic range of the rating value.

5. The method of claim 1, wherein the multimedia content is a live broadcast and the response includes information regarding one or more segments of the multimedia content that have already been presented by the first device.

6. The method of claim 1, wherein the multimedia content is a pre-recorded content and the response includes information regarding one or more segments of the multimedia content that have already been presented by the first device and one or more yet-to-be presented segments of the multimedia content.

7. The method of claim 1, wherein the response includes a cumulative count of favorable and unfavorable evaluations provided by the plurality of the consumers.

8. The method of claim 1, wherein the aggregated result for each of the one or more segments is produced in-part by filtering the information received from the plurality of consumers to mitigate invalid feedback received from one or more of the plurality of consumers.

9. The method of claim 8, wherein the filtering removes a feedback received for at least one segment of the multimedia content that is shorter than a predefined time interval.

10. The method of claim 8, wherein the filtering limits the number of times a particular consumer is allowed to evaluate the multimedia content or a segment thereof.

11. The method of claim 1, wherein the timing information is obtained from time codes associated with a wireless transmission of the multimedia content.

12. The method of claim 1, wherein the timing information is obtained from time codes associated with the multimedia content as stored on an optical data storage medium.

13. The method of claim 1, wherein the timing information is further obtained by:
    computing one or more fingerprints for the portion(s) of the multimedia content; and
    matching the computed fingerprints against a sequence of fingerprints stored at a fingerprint database.

14. The method of claim 1, wherein the received response includes one or more of the following:
- a statistical feedback summary for each of the one or more segments of the multimedia content;
- information corresponding to yet-to-be-presented segments of the multimedia content; or
- information corresponding to feedback provided by a subset of the plurality of consumers.

15. The method of claim 1, further comprising receiving additional information associated with the multimedia content based on the obtained timing information, the additional information comprising one or more of:
- information associated with a character appearing in a particular segment of the multimedia content that is being presented, or
- information associated with a scene in a particular segment of the multimedia content that is being presented.

16. The method of claim 1, further comprising receiving one or more of: a reward based on the obtained timing information, or an opportunity for purchasing an item based on the obtained timing information.

17. A device, comprising:
- a processor; and
- a memory comprising processor executable code, the processor executable code, when executed by the processor, configures the device to:
- obtain timing information associated with at least a portion of the multimedia content while the multimedia content is being presented by a second device, the timing information identifying temporal location(s) of one or more segments of the multimedia content within a timeline of the multimedia content, wherein the timing information is produced from extraction of one or more watermark messages that include the timing information associated with the one or more segments of the content;
- receive feedback regarding the multimedia content from a user interface while the multimedia content is being presented by the second device, wherein the feedback is received independently from the timing information obtained from the one or more watermark messages;
- use the timing information to associate the received feedback with the one or more segments of the multimedia content;
- transmit the received feedback and information indicative of association of the received feedback with the one or more segments on the timeline of the multimedia content to a database; and
- receive a response from the database while the multimedia content is still being presented by the second device, the response comprising information regarding one or more segments of the multimedia content, the response having been produced from information received from a plurality of consumers of the multimedia content on a segment-by-segment basis and the information received from the plurality of consumers having been processed to obtain an aggregated result for each of the one or more segments of the multimedia content.

18. A computer program product, embodied on one or more non-transitory computer readable media, comprising:
- program code for obtaining, at a second device, timing information associated with at least a portion of the multimedia content while the multimedia content is being presented by a first device, the timing information identifying temporal location(s) of one or more segments of the multimedia content within a timeline of the multimedia content, wherein the timing information is produced from extraction of one or more watermark messages that include the timing information associated with the one or more segments of the content;
- program code for receiving feedback regarding the multimedia content from a user interface while the multimedia content is being presented by the first device, wherein the feedback is received independently from the timing information obtained from the one or more watermark messages;
- program code for using the timing information to associate the received feedback with the one or more segments of the multimedia content;
- program code for transmitting the received feedback and information indicative of association of the received feedback with the one or more segments on the timeline of the multimedia content to a database; and
- program code for receiving a response from the database while the multimedia content is still being presented by the first device, the response comprising information regarding one or more segments of the multimedia content, the response having been produced from information received from a plurality of consumers of the multimedia content on a segment-by-segment basis and the information received from the plurality of consumers having been processed to obtain an aggregated result for each of the one or more segments of the multimedia content.

19. A device, comprising:
- a timing information detector to receive one or more timing information associated with at least a portion of a multimedia content while the multimedia content is being presented by a second device, the timing information identifying temporal location(s) of one or more segments of the multimedia content within a timeline of the multimedia content, the timing information detector wherein the timing information is produced from extraction of one or more watermark messages that include the timing information associated with the one or more segments of the content;
- a user interface to receive feedback regarding the multimedia content, wherein the feedback is received independently from the timing information;
- a synchronization component coupled to the timing information detector and to the user interface to associate the received feedback with the one or more segments of the multimedia content based on the timing information obtained from the one or more watermark messages; and
- a communication unit to:
- transmit the received feedback and information indicative of association of the received feedback with the one or more segments on the timeline of the multimedia content to a database; and
- receive a response at the second device from the database while the multimedia content is still being presented by the second device, the response comprising information regarding one or more segments of the multimedia content, the response having been produced from information received from a plurality of consumers of the multimedia content on a segment-by-segment basis, and the information received from the plurality of consumers having been processed to obtain an aggregated result for each of the one or more segments of the multimedia content.

20. The device of claim 19, further comprising a display for presenting the response that includes a graphical representation of a rating value of the multimedia content on a segment-by-segment basis as a function of timeline of the multimedia content.

21. The device of claim 20, wherein the graphical representation includes identifiable salient points along the timeline of the multimedia content.

22. The device of claim 20, further comprising one or more controls to allow varying one or more of: a granularity of the timeline of the graphical presentation or a dynamic range of the rating value.

23. The device of claim 19, wherein the multimedia content is a live broadcast and the response includes information regarding one or more segments of the multimedia content that have already been presented by the second device.

24. The device of claim 19, wherein the multimedia content is a pre-recorded content and the response includes information regarding one or more segments of the multimedia content that have already been presented by the second device and one or more yet-to-be presented segments of the multimedia content.

25. The device of claim 19, wherein the response includes a cumulative count of favorable and unfavorable evaluations provided by the plurality of the users.

26. The device of claim 19, wherein the aggregated result for each of the one or more segments is produced in-part by filtering the information received from the plurality of consumers of the multimedia content to mitigate invalid feedback received from one or more of the plurality of consumers.

27. The device of claim 26, wherein the filtering removes a feedback received for at least one segment of the multimedia content that is shorter than a predefined time interval.

28. The device of claim 26, wherein the filtering limits the number of times a particular consumer is allowed to evaluate the multimedia content or a segment thereof.

29. The device of claim 19, wherein the timing information detector further obtains the timing information from one or more of: time codes associated with a wireless transmission of the multimedia content, or time codes associated with the multimedia content as stored on an optical data storage medium.

30. The device of claim 19, wherein the timing information detector is further configured to:
compute one or more fingerprints for the portion(s) of the multimedia content; and
match the computed fingerprints against a sequence of fingerprints stored at a fingerprint database to obtain the timing information.

31. The device of claim 19, wherein the received response includes one or more of the following:
a statistical feedback summary for each of the one or more segments of the multimedia content;
information corresponding to yet-to-be-presented segments of the multimedia content; or
information corresponding to feedback provided by a subset of the plurality of consumers.

32. The device of claim 19, further comprising one or more of:
a microphone coupled to the timing information detector to deliver an audio portion of the multimedia content to the timing information detector while the multimedia content is being presented by the second device,
a camera coupled to the timing information detector to deliver a video portion of the multimedia content to the timing information detector while the multimedia content is being presented by the second device, or
a wireless communication interface coupled to the timing information detector to deliver a portion of the multimedia content to the timing information detector while the multimedia content is being presented by the second device.

33. The device of claim 19, wherein the communication unit further receives additional information associated with the multimedia content based on the obtained timing information, the additional information comprising one or more of:
information associated with a character appearing in a particular segment of the multimedia content that is being presented, or
information associated with a scene in a particular segment of the multimedia content that is being presented.

34. The device of claim 19, wherein the communication unit further receives one or more of: a reward based on the obtained timing information, or an opportunity for purchasing an item based on the obtained timing information.

35. A system comprising the device of claim 19, further comprising:
a remote server including the database, the remote sever also comprising:
a receiver to receive the transmitted feedback and the associated timing information;
a processor to process the feedback and the associated timing information to produce at least a portion of the response; and
a transmitter to transmit the response.

36. The system of claim 35, further including an additional device configured to receive the response.

37. A portable electronic device comprising the device of claim 19.

* * * * *